United States Patent [19]

Miele, Jr.

[11] 4,124,931
[45] Nov. 14, 1978

[54] METHOD OF ASSEMBLYING A PRESSURE GAUGE

[75] Inventor: Raymond D. Miele, Jr., Springfield, N.J.

[73] Assignee: Eltra Corporation, Toledo, Ohio

[21] Appl. No.: 777,207

[22] Filed: Mar. 14, 1977

[51] Int. Cl.² .......................................... B23Q 17/00
[52] U.S. Cl. ..................................... 29/407; 29/469; 73/738; 73/741
[58] Field of Search ................... 29/407, 469; 73/411, 73/416, 395, 418

[56] References Cited

U.S. PATENT DOCUMENTS

| 2,215,013 | 9/1940 | Mickelberg | 73/416 |
| 3,147,623 | 9/1964 | Johnson et al. | 73/418 |
| 3,434,330 | 3/1969 | Ingham et al. | 73/416 X |
| 3,701,284 | 10/1972 | DeMeyer | 73/416 |

*Primary Examiner*—Victor A. DiPalma
*Attorney, Agent, or Firm*—Robert E. Greenstein

[57] ABSTRACT

A method for assembling a pressure gauge which employs a removable metal safety plate. The gauge movement, comprising a Bourdon tube, pointer, gauge dial and gear mechanism is mounted on both sides of a metal safety plate and the entire assembly is then inserted into the gauge case and fastened in place.

4 Claims, 3 Drawing Figures

U.S. Patent  Nov. 14. 1978  Sheet 1 of 2  4,124,931

METHOD OF ASSEMBLYING A PRESSURE GAUGE

BACKGROUND OF THE INVENTION

The present invention relates to a method of assembly for a pressure gauge in which a rigid safety plate, preferably metallic, has the Bourdon tube and the associated gear mechanism mounted on one side and the gauge dial and pointer mounted on the other side, so as to provide protection for the observer of the gauge in the event of a Bourdon tube failure or rupture. More specifically, this invention relates to a method for installing a preassembled and calibrated unit in a gauge case or housing, which includes a safety plate having the Bourdon tube and gear mechanism mounted on one side and the gauge dial and pointer mounted on the other side. This new and useful method offers particular utility in that it provides an economical method of gauge construction, especially when used in conjunction with the apparatus of the invention for mounting a viewing window on a pressure gauge case, disclosed and claimed in the copending application, Ser. No. 772,209, filed Mar. 14, 1977 and assigned to the same assignee.

Pressure gauges employing a Bourdon tube frequently are utilized for the measurement of very high pressure gases and liquids, for example, on the order of several thousand pounds per square inch. Dynamic changes in the pressure of the fluid or gas under measurement cause expansion or contraction of the Bourdon tube, and this movement is transmitted through a gear mechanism to a pointer or indicating needle that moves in relation to a graduated gauge dial. The term "gauge movement", as used herein, refers to the Bourdon tube, gauge dial, pointer and gear mechanism.

There is always the possibility of a Bourdon tube rupture from an over pressure condition. If this happens in a gauge without a safety plate, as defined below, the fluid or gas in the tube and the gauge movement may be propelled from the interior of the case, and some of these parts may shatter the viewing window. Therefore, it is desirable to employ a safety plate to block the path from the Bourdon tube and gear mechanism to the viewing window. The safety plate frequently is constructed of metal and is integral with the gauge case. For example, in FIG. 1 of U.S. Pat. No. 3,141,335, the safety plate 14 is an inwardly extending portion of wall 10. Assembly of the gauge consequently requires mounting the Bourdon tube 18 and gear mechanism on one side of the safety plate 14, and mounting the related pointer and dial on the other side. This particular approach presents several distinct disadvantages. The case construction is more expensive, and assembly and disassembly of the gauge movement is unduly complicated, as it necessitates removal of the gage movement from both ends of the case.

SUMMARY OF THE INVENTION

In the method of the present invention, the gauge movement is mounted on both sides of the safety plate, and the safety plate and gauge movement, as a unit, are inserted and fastened in place within the gauge case. By this method, an exceedingly simple, economical and reliable form of pressure gauge construction is achieved. In addition, a damaged or defective gauge movement can be replaced easily by a preassembled, factory calibrated unit.

Because this method requires only the mounting of the safety plate unit through the front or window end of the case, there are no specific requirements for an opening on the rear of the case. Pressure gauges frequently employ a means for relieving case pressure buildups, and this method permits the use of any of the well known techniques for relieving pressure buildup within the interior of the case; such as a blow-off back (shown herein), a pressure release valve or a diaphramatic back.

Accordingly, it is an object of the present invention to provide a method of assembly for a pressure gauge utilizing a safety plate by which the gauge movement and safety plate are assembled as a unit, calibrated externally of the gauge case and then mounted.

Still further objects and benefits of the present invention will be apparent to those skilled in the art from the following drawing, detailed description and claims wherein:

DETAILED DESCRIPTION

Figure 1:
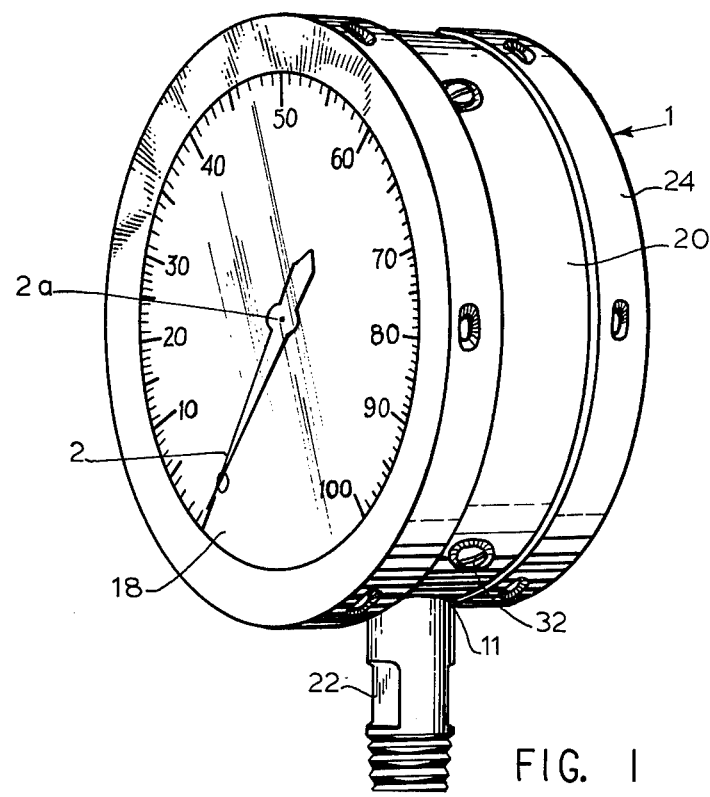
FIG. 1 is a perspective view of a pressure gauge assembled according to the present method.
Figure 2:
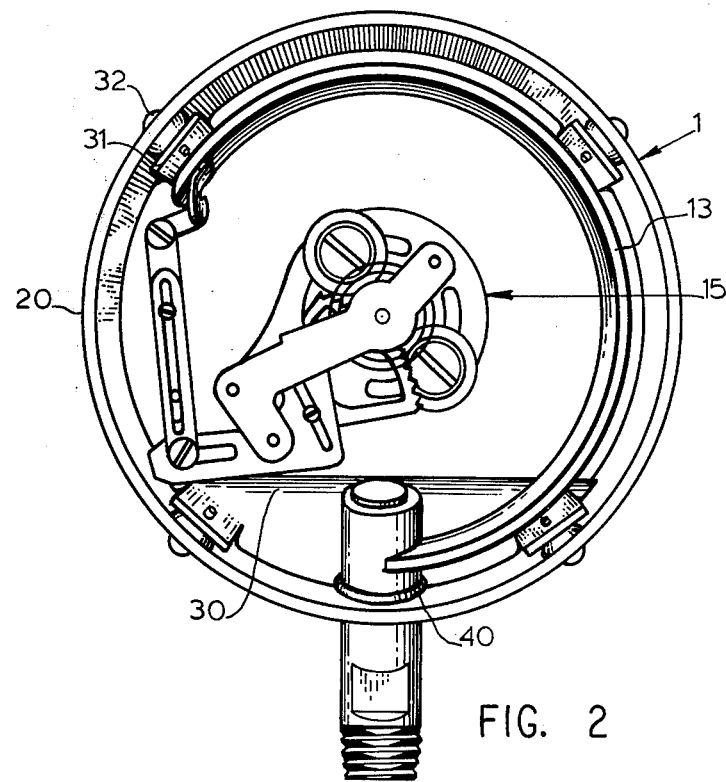
FIG. 2 is a rear view of the gauge shown in FIG. 1; however, with the rear plate thereof removed.

Referring now to the drawing and specifically to FIG. 1, the reference numeral 1 therein denotes a pressure gauge fabricated by the method of the present invention. As shown, gauge 1 includes a dial 18 and a pointer 2, both being mounted within a generally cylindrical container or case 20. As shown in FIG. 2, a plurality of fasteners 32 are used to retain a metal plate 30 at a preselected position within the interior portion of case 20. A Bourdon tube 13 is shown, which has an arcuate shape and includes a threaded nipple inlet 22 on its lower end, extending through the lower portion of case 20, by which fluid or gas pressure is applied to the tube, causing it to expand radially. It should be noticed in FIG. 3 that a viewing window 14 is retained in position on the front of case 20 by a particular mounting apparatus, collectively denoted herein by numeral 8. Apparatus 8 is the subject of the copending application previously mentioned. It should be observed that this apparatus facilitates removal of the window and correspondingly permits easy access to the interior of case 20 from the case front. In addition, from the following detailed description it will become apparent that apparatus 8 has particular utility when used in conjunction with the method of the present invention.

Figure 3:
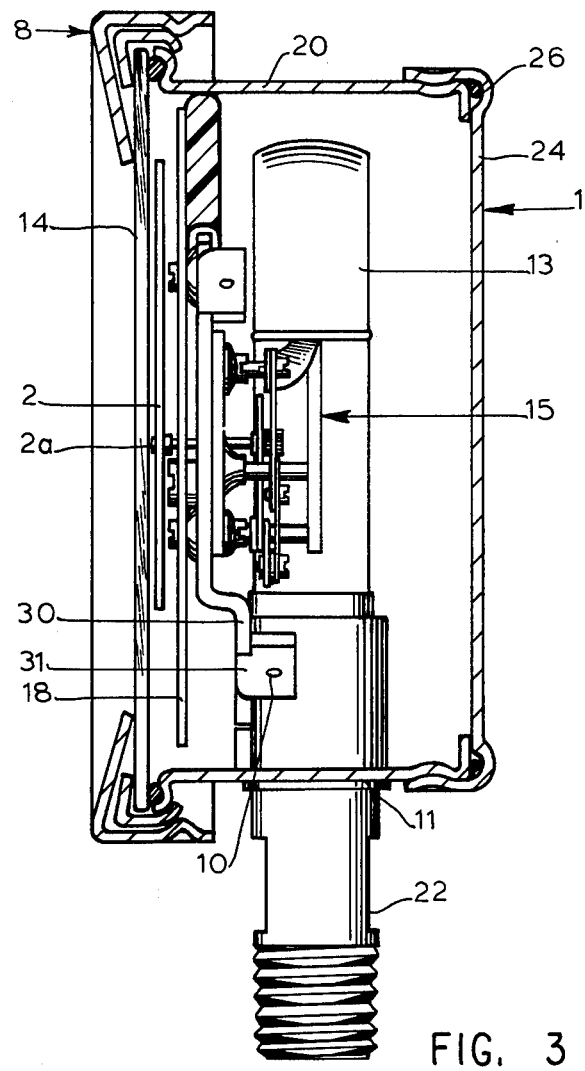
FIG. 3 is a cross-sectional view of the pressure gauge shown in FIG. 1 along line 3—3 therein.

In FIG. 3, the rear of case 20, as viewed from the right, is provided with a removable back plate 24, which is snapped in place. A resilient gasket 26 is positioned between the case and back plate 24 to provide a fluid tight seal. If there is pressure build-up within the interior portion of the case, plate 24 is blown off, releasing the fluid or gas within the case to the rear, away from an observer. It should be noted that this protective feature acts in conjunction with the intrinsic feature provided by the safety plate 30, described in amplified detail below.

Turning now to the internal components of gauge 1, again it should be observed in FIGS. 1 and 3 that Bourdon tube 13. expands and contracts radially in response to the fluid or gas pressure applied to it through inlet 22. The Bourdon tube movement is transmitted to pointer 2 through the gear mechanism generally designated by numeral 15, and shaft 19, which passes through plate 30. Thus, the pressure is indicated as pointer 2 exhibits rotational movement relative to dial 18 as the Bourdon tube contracts and expands.

As stated above, safety plate 30 prevents shattering of window 14 if the Bourdon tube ruptures. Thus, it should be noticed in FIG. 3 that dial 18 and pointer 2 are located on the front side of plate 30 and that Bourdon tube 13 and gear mechanism 15 are located on the rear side. In this way, any parts and gas or fluid from Bourdon tube 13 and gear fragments are deflected away from the case front. This not only prevents the parts and gas from reaching window 14, but also prevents dial 18 and pointer 2 from being dislodged and also propelled at the window.

With the foregoing in mind, to assemble pressure gauge 1 in accordance with the method of the present invention, safety plate 30 is constructed to contain a plurality of tabs 31 (preferably four) located along its outer edge. A threaded hole 10 is provided in each of these tabs to accept fastening screws 32. A like plurality of holes are placed in the wall of case 20, and align with holes 10 when safety plate 30 is positioned properly in the case. As stated above, inlet 22 is welded to the plate 30.

The gear mechanism 15 is fastened in place on safety plate 30 on the same side as the Bourdon tube 13, and the two are connected. Dial 18 is fastened to the other side of the plate 30 with the shaft 2A passing through. Pointer 2 then is connected to the shaft. It should be noted that in this manner a totally functional pressure gauge movement is assembled on plate 30. For clarity, the term "assembly" is used hereinafter to designate the structure including safety plate 30 and the functional gauge movement, assembled thereon. This assembly can be connected to a suitable pressure source for calibration and adjustment before it is inserted into case 20.

In FIG. 2, a hole 11 is shown in the bottom of case 20, to receive inlet 22 as the assembly is inserted. A gasket 40 is placed around inlet 22 to seal hole 11 when the inlet 22 is in place. The assembly is positioned in the case so that holes 10 are aligned with the predrilled holes in case 20. Fasteners 32 are then inserted and suitably tightened. In this fashion, the operational assembly is held firmly in place within case 20.

After the assembly is inserted and positioned, window 14 is placed on the case, and the apparatus 8, which retains the window in position, is secured around the front edge, as shown herein, and described in greater detail in the aforementioned copending patent application.

It is to be appreciated that the foregoing method is particularly advantageous as it anticipates the use of a factory calibrated gauge movement for field repairs. A user does not have to replace a defective gauge movement by disassemblying and removing it from the case. Instead, the entire safety plate assembly is removed and a calibrated unit installed in its place.

It should be noted, as well, this feature is particularly significant when considered along with the window mounting apparatus 8 disclosed in the aforementioned copending patent application. The window mounting apparatus 8 enables easy removal of the gauge window 14, reuse of all the window mounting hardware and access to the front of the gauge movement. The method herein enables easy removal and replacement of the gauge movement and the removable back 24 allows access to the rear of the gauge movement. In essence, the disclosed method and apparatus combine to yield a pressure gauge which is economical and easy to repair and affords ample access to each side of the gauge movement.

While I have described that which is is at present the preferred embodiment of the present invention, it will be obvious to those skilled in the art that there are numerous possible variations and modifications which can be made to the described invention, but which nevertheless capture the true spirit and scope of the invention. Therefore, the following claims are intended to describe and cover all equivalents, modifications and variations.

I claim:

1. A method of assembly for a pressure gauge including a case and a gauge movement, comprising the steps of:
   mounting the gauge movement on a plate,
   inserting said plate and mounted gauge movement into the case, and
   fastening said plate to the wall of said case with fasteners that pass through the wall and enter a portion of said plate.

2. A method of assembly for a pressure gauge including a case and a gauge movement which includes a dial, a Bourdon tube with an attached inlet, a pointer and a gear mechanism operatively connecting said Bourdon tube to said pointer, comprising the steps of:
   mounting said Bourdon tube on a plate,
   mounting the gear mechanism on said plate operatively connected to the Bourdon tube,
   mounting the dial on the opposite side of said plate,
   connecting the pointer to the gear mechanism,
   inserting the plate with the mounted gear movement into the case, and
   fastening the plate to the wall of the case with fasteners that pass through the wall and enter a portion of the plate.

3. The method described in claim 2, said Bourdon tube being mounted on said plate by welding the inlet to said plate.

4. The method described in claim 3, comprising the additional step of: calibrating the gauge movement assembled on the plate before it is inserted into the case.

* * * * *